(12) United States Patent
Orschulik et al.

(10) Patent No.: US 11,406,066 B2
(45) Date of Patent: Aug. 9, 2022

(54) TRAY FOR GROWING PLANTS AND SYSTEM COMPRISING A TRAY AND A PLANTING POT

(71) Applicant: Poppelmann Holding GmbH & Co. KG, Lohne (DE)

(72) Inventors: Günther Orschulik, Holdorf (DE); André Timphus, Lohne (DE)

(73) Assignee: Poppelmann Holding GmbH & Co. KG, Lohne (DE)

( * ) Notice: Subject to any disclaimer, the term of this patent is extended or adjusted under 35 U.S.C. 154(b) by 239 days.

(21) Appl. No.: 16/482,004

(22) PCT Filed: Jan. 8, 2018

(86) PCT No.: PCT/EP2018/050370
§ 371 (c)(1),
(2) Date: Jul. 30, 2019

(87) PCT Pub. No.: WO2018/141507
PCT Pub. Date: Aug. 9, 2018

(65) Prior Publication Data
US 2020/0000046 A1 Jan. 2, 2020

(30) Foreign Application Priority Data
Jan. 31, 2017 (DE) .................. 10 2017 101 884.0

(51) Int. Cl.
*A01G 9/02* (2018.01)
*A01G 22/63* (2018.01)

(52) U.S. Cl.
CPC ............. *A01G 9/028* (2013.01); *A01G 22/63* (2018.02)

(58) Field of Classification Search
CPC .... A01G 9/0295; A01G 9/0297; A01G 9/029; A01G 9/027; A01G 9/02; A01G 9/00; A01G 9/045; A01G 2009/003; A01G 9/028; A01G 9/04; A01G 9/0299; B65D 25/10; B65D 21/0233
See application file for complete search history.

(56) References Cited

U.S. PATENT DOCUMENTS 3,866,351 A * 2/1975 Cobia .................. A01G 27/00
47/81
5,022,183 A 6/1991 Bohlmann
(Continued)

FOREIGN PATENT DOCUMENTS

CN 101810111 A 8/2010
CN 102550265 A 7/2012
(Continued)

*Primary Examiner* — Kristen C Hayes
(74) *Attorney, Agent, or Firm* — Husch Blackwell LLP

(57) ABSTRACT

A tray for growing a plant, especially an orchid, with multiple compartments for holding a respective planting pot is provided. The tray comprises at least one fastening means for securing the planting pot. The compartments each have a lower compartment portion designed to receive entirely the planting pot to be inserted, and a respective upper compartment portion comprising the fastening means is formed at least by a compartment wall which is impenetrable to the root system, in particular non-perforated, as well as a system for growing a plant.

15 Claims, 3 Drawing Sheets

(56) References Cited

U.S. PATENT DOCUMENTS

| | | | | |
|---|---|---|---|---|
| 5,094,060 A * | 3/1992 | Caird | ............. | B65D 85/52 |
| | | | | 206/423 |
| 5,481,825 A * | 1/1996 | Aoyama | ............. | A01G 9/088 |
| | | | | 47/18 |
| 5,664,370 A * | 9/1997 | Boudreau | ............. | A01G 9/0295 |
| | | | | 47/87 |
| 8,782,950 B2 * | 7/2014 | Miel | ............. | A01G 9/028 |
| | | | | 47/66.1 |
| 10,531,614 B2 * | 1/2020 | Stott | ............. | A01G 9/02 |
| 2016/0029572 A1 * | 2/2016 | Stott | ............. | A01G 9/04 |
| | | | | 47/66.7 |
| 2017/0064915 A1 * | 3/2017 | Steelandt | ............. | A01G 9/029 |
| 2020/0000046 A1 * | 1/2020 | Orschulik | ............. | A01G 9/028 |
| 2020/0037511 A1 * | 2/2020 | Bremkens | ............. | A01G 9/0295 |

FOREIGN PATENT DOCUMENTS

| | | | | |
|---|---|---|---|---|
| DE | 202014103156 U1 | 11/2015 | | |
| DE | 102017101884 A1 * | 8/2018 | ............. | A01G 9/028 |
| DE | 102017101885 A1 * | 8/2018 | ............. | A01G 9/006 |
| EP | 0680691 B1 | 8/1998 | | |
| EP | 2572571 B1 | 9/2016 | | |
| FR | 3034758 A1 * | 10/2016 | ............. | A01G 9/045 |
| WO | 2009000480 A1 | 12/2008 | | |
| WO | 2009088774 A2 | 7/2009 | | |
| WO | 2015084163 A1 | 6/2015 | | |

\* cited by examiner

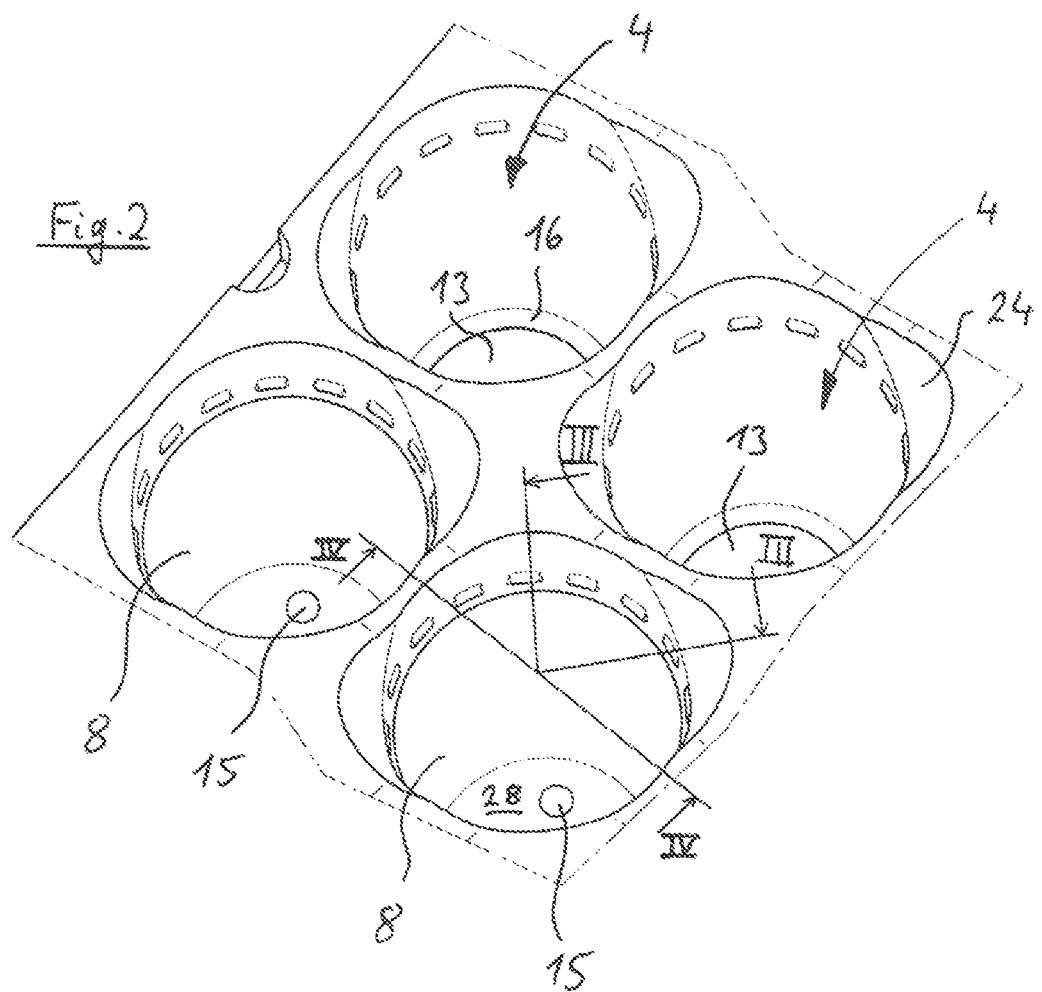

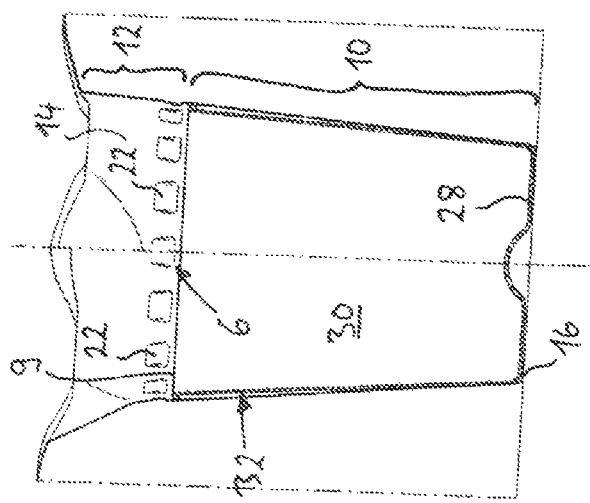
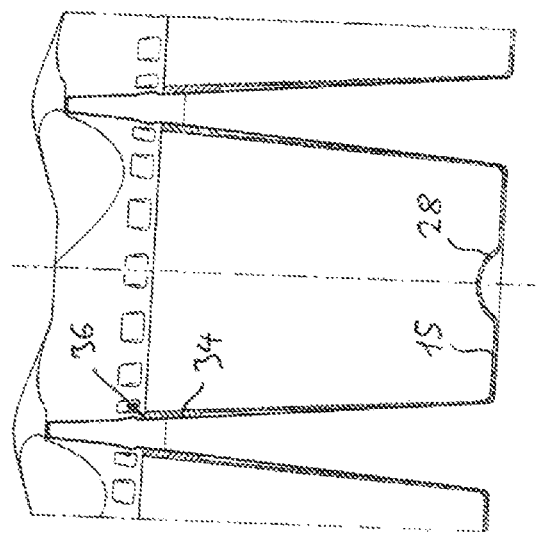

TRAY FOR GROWING PLANTS AND SYSTEM COMPRISING A TRAY AND A PLANTING POT

CROSS REFERENCE

This application claims priority to PCT Patent Application No. PCT/EP2018/050370, filed 8 Jan. 2018, which itself claims priority to German Application No. 10 2017 101884.0, filed 31 Jan. 2017, the entirety of both of which are hereby incorporated by reference.

FIELD OF THE INVENTION

The invention relates to a tray for growing a plant, especially an epiphyte, even more preferably an orchid, with multiple compartments for holding a respective planting pot, wherein the tray comprises at least one fastening means for securing the planting pot. Furthermore, the invention relates to a system comprising an above described tray and a planting pot.

BACKGROUND OF THE INVENTION

In the field of the raising and cultivating of plants, multitudes of planting pots are used, and the number may go into the hundreds or thousands. In order to improve the handling of the individual planting pots, a plurality of planting pots may be assembled on a tray or secured in such a tray. Such trays are known for example from U.S. Pat. No. 5,022,183 A. This shows a tray with multiple compartments, with projections arranged on the bottom of the compartment, interacting with drainage openings of the planting pot in order to secure the planting pot in a compartment of the tray.

The drawback to such a system is that, due to the fastening elements arranged on the bottom of the compartment and interacting with the drainage openings of the planting pot, the planting pots must either be installed before being filled with substrate or when installing the planting pots the fastening elements must displace the substrate introduced into the planting pot. Furthermore, the fastening elements may become soiled by the substrate and thus make it difficult to secure or release the planting pot. If there are problems with the securing or releasing of the planting pot, these securing means are only accessible from the bottom side, so that the entire tray has to be lifted.

Furthermore, especially in the cultivation of epiphytes forming aerial roots such as orchids, it may happen that these grow not only by their leaves, but also their roots into neighboring planting pots. This produces a connection between neighboring planting pots or the plants in neighboring planting pots, making it harder to handle individual planting pots in the tray or requiring a severing of such roots when removing the planting pot, which injures the plants.

SUMMARY OF THE INVENTION

The problem which the present invention proposes to solve is to improve a tray and a system comprising a tray and a planting pot of the above mentioned kind so that the risk of plants growing together in neighboring planting pots is reduced and, if possible, the fastening means are easier to handle at the same time.

This problem is solved by a tray according to the invention, wherein the compartments each have a lower compartment portion designed to receive entirely the planting pot to be inserted, and a respective upper compartment portion comprising the fastening means is formed at least by a (lateral) compartment wall which is impenetrable to the root system, in particular nonperforated. Depending on the type of plant, the lateral wall is impenetrable to root systems or roots when all existing openings are at least narrower than 3 mm or are formed as a slot with even more closely adjoining or touching edges.

The fastening means when a planting pot is inserted into the compartment are situated above the planting pot and are easily accessible from above. A soiling of the fastening means with substrate is largely avoided in this way, since the substrate is typically present in the planting pot located beneath the fastening means. Thus, the fastening means can be handled more easily and reliably. Furthermore, the fastening means are arranged on, in or through an especially non-perforated compartment wall, forming the upper compartment portion.

The compartment wall thus constitutes a kind of continuation of the planting pot. In particular, when cultivating an epiphyte in the form of an orchid, roots possibly growing out from the planting pot will thus find no recesses in the upper compartment portion through which they may grow and thus become attached to the compartment. Furthermore, it is difficult for such roots to grow over into planting pots which are situated in the adjacent compartment, since these roots have to span during their growth a larger distance as compared to the spacing of the compartments. This increases the effective spacing between neighboring planting pots in the compartments for the roots (or leaves), without increasing the standing surface of the tray as compared to a traditional tray. Because the tray hinders neighboring plants from growing together, the handleability of the plants is improved.

The upper compartment portion is situated, in regard to a vertical line, at a lower standing surface of the tray but still above the lower compartment portion. While the upper compartment portion is formed substantially by the lateral compartment wall and the interior space of the compartment located in between, the lower compartment portion is bounded by the lower lateral compartment wall and the bottom of the compartment and thus also encompasses the interior space of the compartment located inside the lower lateral compartment wall.

In particular, the fastening means are formed without eyelets, openings and/or hooklike shapes on which the plants might get caught or hooked. Alternatively, the fastening means can also be produced by a connection formed by gluing or welding the planting pot and the tray together, the fastening means being then present in the form of this connection.

Preferably the compartment wall of the upper compartment portion is entirely nonperforated, so that there is a limiting of the growth region of the plants along the entire circumference of the compartment, i.e., 360° for a round compartment in cross section.

In one advantageous embodiment of the tray, the lower compartment portion comprises a bottom forming a support for the planting pot. The tray thus provides a defined standing surface for a planting pot to be installed, on which such a planting pot can rest. In this way, the planting pot does not need to be held in the compartment by clamping, for example. This makes it easier to install and remove a planting pot to be installed from the compartment of the tray.

Alternatively or additionally, one or more shoulders or bulges may be present in the compartment wall, forming a support. In particular, the compartment may in this way form several supports for different pots. For example, a planting pot may rest by its planting pot rim against a support formed in particular as a fully encircling support.

Advantageously, the lower compartment portion likewise has a nonperforated side wall at least in its upper third and thus in an area bordering on the upper compartment portion. Especially preferably, the compartment is provided with an entirely nonperforated side wall. Thus, it is also possible to install in the lower compartment portion planting pots whose upper planting pot rim is situated below the border with the upper compartment portion, for example the border configured by fastening means. The fastening means thus secure the planting pot in the compartment, even though the planting pot can still be turned for example about a longitudinal center axis. In particular, the at least one fastening means forms an (upper) boundary of the lower compartment portion. Alternatively, the fastening means may also then form a broader transition region between lower and upper compartment portion.

In a further advantageous embodiment of the invention, the wall thickness in the area of the fastening means is reduced as compared to an area of the compartment not having the fastening means. The resulting flexibility and/or elastic de-formability of the fastening means can make it easier to introduce the planting pot when this is moved past the elastically deforming fastening means in order to take up an end position in the compartment and the fastening means then returns to its starting position securing the planting pot. In particular, the tray may be produced by thermoforming, so that the wall thickness of the fastening means can be influenced by the thermoforming of the tray.

Preferably the fastening means is configured to act on a planting pot rim of the planting pot to be inserted into the compartment. Such a design of the fastening means avoids having to arrange a corresponding mating piece to the fastening means of the tray on the planting pot. Thus, the tray according to the invention can be used ideally with customary planting pots. In order to act on the planting pot rim, the clear width of the inner cross section of the compartment is reduced at the height of the fastening means and by the fastening means as compared to an adjoining cross section with no fastening means.

In one preferred embodiment, the fastening means is configured as a latching cam. Such a latching cam is a protruding element enclosing the compartment wall flush at its edges. Since such a cam is preferably movable on account of the flexibility of the material, either that of the cam material or the material of the compartment wall, such a latching cam can be formed on the inside of the compartment preferably by thermoforming. Such a configuration of the fastening means as a latching cam prevents the plants during their growth from becoming hooked to the fastening means. In this way, it is easier to install and remove plants or planting pots with plants from the tray. Especially advantageously, the cam is formed with rounded transitions to the compartment wall. This further reduces the risk of getting hooked.

Preferably the fastening means and especially a fastening means configured as a latching cam is formed as an undercut bulge or indentation of the compartment wall. By a bulge of the compartment wall is meant a portion of the compartment wall formed from the surrounding compartment wall toward the longitudinal center axis of the compartment. Thus, the cam is formed directly from the material of the compartment wall. This saves material during the production of the tray, since the cam is formed by a shaping of material already present in the case of a tray formed by thermoforming. As a result of the forming process, the wall thickness is less in regions of the cam than the material thickness of the compartment wall. Furthermore, a continuous surface is assured on the inside of the compartment wall.

In one preferred embodiment, the fastening means configured in particular as a latching cam has a starting slope at the top end. Such a starting slope on the latching cam facilitates the inserting of a planting pot to be placed in the tray.

Advantageously, a compartment comprises multiple fastening means distributed around the periphery of the compartment wall, especially multiple latching cams distributed preferably uniformly around the periphery. Thanks to the use of multiple fastening means distributed around the periphery, the secure seating and purchase of a planting pot to be inserted into the compartment is enhanced.

In one preferred embodiment, the compartment wall has at least one recessed engagement area. A recessed engagement area is a region in particular more strongly beveled than the other, preferably conically shaped compartment wall, at a distance from a longitudinal center axis of the compartment or along the longitudinal center axis. Such an engagement area makes access easier to a planting pot inserted into the compartment and supports in particular a sideways engaging in the direction of the plant located in the planting pot.

The above stated problem is likewise solved by a system for growing a plant, especially an epiphyte, preferably an orchid, wherein the system has a tray according to the invention as described above or hereafter and at least one planting pot which is or can be secured in the compartment of the tray, comprising a planting pot bottom and a planting pot wall which is impenetrable to the root system, in particular nonperforated. Thanks to the use of a planting pot with such a lateral planting pot wall, especially a nonperforated one, a smooth surface is provided to the plants with the system according to the invention, which continues from the planting pot across the planting pot wall into the region of the upper compartment portion. The compartment wall of the upper compartment portion and the planting pot wall form a boundary for a growth region that is impenetrable for a root system. Since the planting pot is secured in the tray, it is easier to remove the plants, possibly along with the substrate, since the root system of the plants cannot grow together with recesses for example in the planting pot or compartment wall either in the region of the planting pot or in the upper compartment portion. The force needed to remove a plant possibly clinging to the especially nonperforated wall of the planting pot and possibly to the upper compartment portion, with or without its substrate, is less than the force needed to loosen and remove the planting pot from the compartment.

Preferably, the planting pot comprises at least one securing means, which can interact with the fastening means of the compartment. Hence, the securing of the planting pot of the system according to the invention can be done for example by a cam present on the sides of the planting pot, which interacts with a shoulder of the compartment.

Advantageously, a transition in the system between an upper rim of the planting pot and the compartment wall is impenetrable to roots, and in particular the planting pot rests all around by an upper planting pot rim against the compartment wall. Thanks to such a configuration, a gap between the planting pot and the compartment wall is minimized, so that the danger of roots getting into this gap and the plants becoming stuck to their planting pot and the tray or growing together, making it hard to remove them from the system, is decreased.

In a further embodiment according to the invention, the planting pot rim has an outwardly projecting collar. In this way, the planting pot rim is strengthened, so that the action of a fastening means on the planting pot rim does not cause damage to the planting pot. The reliability of the system when inserting and removing the planting pots is improved. An outwardly projecting collar does not hinder the removing of the plants, possibly along with substrate, since the projection does not protrude into the region in which the plants are arranged or the region through which they have to be removed. In particular, reinforcing braces supporting the collar are distributed around the periphery on the planting pot outside beneath the planting pot rim, so that the planting pot is strengthened in the rim region for the interaction with fastening means of the tray of the system. The handling of the planting pots and the action of the fastening means become more reliable.

In particular, it has been found to be advantageous in one modification of the invention for the tray to be made by thermoforming and the planting pot by injection molding. Surprisingly, orchids for example adhere less in a planting pot made by injection molding than in a planting pot made by thermoforming. The upper compartment portion plays a lesser role from the standpoint of material for the adherence of the plants, so that the tray can preferably be made by thermoforming.

In one preferred embodiment, the planting pot and the upper compartment portion are in the form of a frustum. In this way, it is possible to rotate the planting pot installed in the compartment. This then allows the plants to be oriented in the tray. Thanks to the upward broadening shape of a frustum, it is furthermore easier to remove the plants, possibly with substrate.

In one special embodiment, the system comprises respective top surface areas arranged between neighboring compartments of the tray, having a configuration which rises upward from a compartment opening. The top surfaces rise up until they abut against the regions emerging from neighboring compartment openings. This makes it easier to water the plants, since such a top surface area channels water directly into the corresponding compartment.

Planting pots and compartments are preferably adapted to each other such that a transition between an upper rim and the lateral wall of the compartment is free of gaps, so that no roots or root system can grow in there.

Preferably, the tray of the system has handling aids in edge regions. Such handling aids can make it easier to separate trays from a stack. In particular, the singling out of a tray from a stack is easier when each tray has such a handling aid. These may be formed, for example, by protrusions or indentations in edge regions of the tray.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 2 is a cut-out II of the system of FIG. 1.

FIG. 3 is a section through a compartment of a tray of the system according to the invention with inserted planting pot per section III in FIG. 2.

FIG. 4 is a section through a compartment of a tray of the system according to the invention with inserted planting pot per section IV in FIG. 2.

DETAILED DESCRIPTION OF THE DRAWINGS

Figure 1:
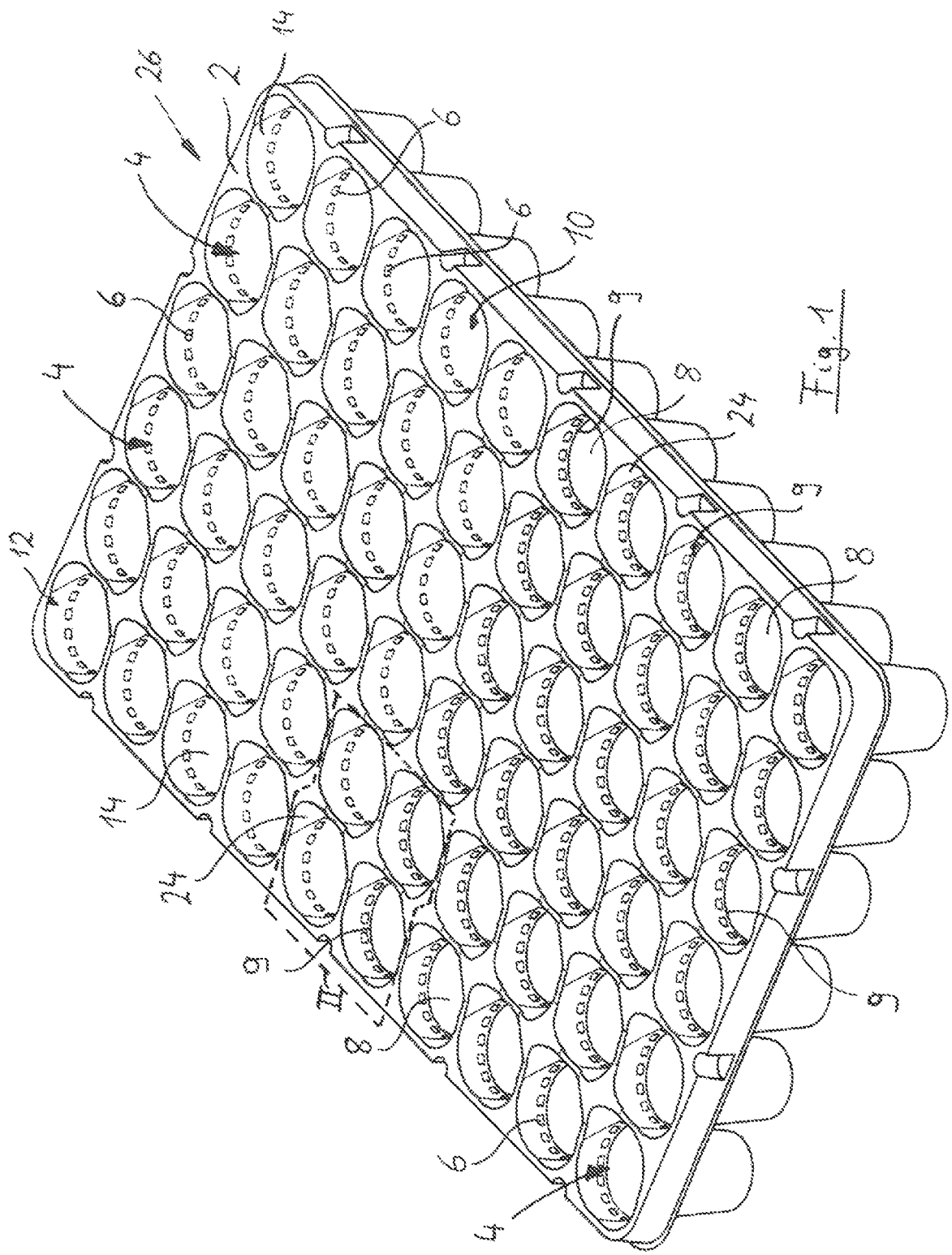
FIG. 1 is an exemplary embodiment according to the invention.

In the following, equivalent elements of the invention will be provided with the same reference number, insofar as is reasonable. The following described features of the exemplary embodiments may also be subject matter of the invention in other feature combinations with the features of the independent claims.

FIG. 1 shows a tray 2 for growing a plant with multiple compartments 4. In the compartments 4 of the tray 2, several planting pots 8 have been inserted by their upper planting pot rims 9. The combination of tray 2 and planting pot 8 forms a system 26 for growing a plant.

The tray 2 comprises fastening means 6. In the present instance, these are arranged on the compartment wall 14 of an upper compartment portion 12 (see FIG. 3). The planting pots 8 are introduced into a lower compartment portion 10 in such a way that the upper compartment portion 12 formed by a nonperforated compartment wall 14 extends beyond the inserted planting pot 8. The fastening means 6 in the present exemplary embodiment is formed as a latching cam.

The tray 2 according to the invention furthermore has an engagement area 24 in the upper area of the compartment 4. This makes it easier to handle planting pots 8 inserted into the compartment 4.

The compartments 4 have a bottom 16 (FIG. 2). The bottom 16 is formed as a support for planting pots. It is formed broad enough, not counting a lower drainage and aeration opening 13, that a planting pot 8 which is installed in the compartment 4 stands on this bottom 16. Planting pot bottom openings 15 at least partly overlap with the opening 13 in a top view.

FIGS. 3 and 4 each time show a section through a compartment 4 with installed planting pot 8. It can be seen that the fastening means 6 in the form of a latching cam are formed from the compartment wall 14 in the upper compartment portion 12. The latching cams thus pass smoothly into the compartment wall 14 at their edges. The latching cams have a starting slope 22 on their side facing away from the bottom 16. This starting slope makes it easier to introduce a planting pot 8 into the compartment 4 across the latching cams. In the opposite direction, i.e., a movement of the planting pot 8 away from the bottom 16, the latching cams produce a blocking effect. Thus, the planting pot 8 cannot be easily removed from the compartment 4. The planting pot 8 of a system 26 according to the invention has a planting pot bottom 28 and a planting pot wall 30. The region enclosed by the planting pot wall 30 is in the form of a frustum. The planting pot bottom openings 15 of the planting pot bottom 28 are preferably at the lowest point of the planting pot 8. Through this cavity, watering liquid for example can leave the planting pot.

The planting pot 8 has a planting pot rim 9 with a collar. This sticks out from the planting pot wall 30 on the planting pot outside 32. The planting pot rim 9 and also the collar are strengthened by reinforcing braces 34. These reinforcing braces 34 support the securing action of the latching cams in cooperation with the planting pot rim 9.

A transition 36 between an upper rim 9 and the lateral wall of the compartment 4 is free of gaps, so that no roots or no root system can grow in there. The rim 9 in this exemplary embodiment lies against the lateral wall of the lower compartment portion 10.

The invention claimed is:

1. A tray for holding at least one planting pot and for growing a plant, the tray comprising:
multiple compartments each for holding a respective planting pot,
at least one fastening means for securing the planting pot,
wherein the compartments each have a lower compartment portion to receive entirely the respective planting pot to be inserted, and a respective upper compartment portion comprising the fastening means is formed at least by a compartment wall which is impenetrable to the root system, which is nonperforated;
wherein the fastening means is configured as a latching cam.

2. The tray as claimed in claim 1, wherein the compartment wall of the upper compartment portion is entirely nonperforated.

3. The tray as claimed in claim 1, wherein the lower compartment portion comprises a bottom forming a support for the planting pot.

4. The tray as claimed in claim 1, wherein the lower compartment portion likewise has a nonperforated side wall in its upper third.

5. The tray as claimed in claim 1, wherein a wall thickness in the area of the fastening means is reduced as compared to an area of the compartment not having the fastening means.

6. The tray as claimed in claim 1, herein the fastening means is configured to act on a planting pot rim of the planting pot to be inserted into the compartment.

7. The tray as claimed in claim 1, wherein the fastening means has a starting slope at the top end.

8. The tray as claimed in claim 1, wherein the fastening means is formed at least partly as an undercut bulge or indentation of the compartment wall.

9. The tray as claimed in claim 1, wherein the compartment comprises multiple fastening means distributed around the periphery of the compartment wall.

10. The tray as claimed in claim 1, wherein the compartment wall has at least one recessed engagement area.

11. A system for growing a plant, the system comprising:
a tray as claimed in claim 1 and
at least one planting pot is secured in the lower compartment portion of a compartment of the tray, comprising a planting pot bottom and a nonperforated planting pot wall, wherein the compartment wall of the upper compartment portion and the planting pot wall form a boundary for a growth region which is impenetrable to the root system.

12. The system as claimed in claim 11, wherein the planting pot comprises at least one securing means, which can interact with the fastening means of the compartment.

13. The system as claimed in claim 11, wherein a transition between an upper rim of the planting pot and the lateral wall of the compartment is impenetrable to the root system, and the planting pot rests all around by the upper planting pot rim against the compartment wall.

14. The system as claimed in claim 13, wherein the planting pot rim has an outwardly projecting collar, and reinforcing braces supporting the planting pot rim are distributed around the periphery on the planting pot outside beneath the collar.

15. The system as claimed in claim 11, wherein the tray is made by thermoforming and the planting pot by injection molding.

* * * * *